(12) United States Patent
Peterson et al.

(10) Patent No.: US 9,342,256 B2
(45) Date of Patent: May 17, 2016

(54) EPOCH BASED STORAGE MANAGEMENT FOR A STORAGE DEVICE

(71) Applicant: Fusion-io, Inc., Salt Lake City, UT (US)

(72) Inventors: James G. Peterson, San Jose, CA (US); Nisha Talagala, Livermore, CA (US); Swaminathan Sundararaman, San Jose, CA (US); Sriram Subramanian, San Jose, CA (US)

(73) Assignee: SANDISK TECHNOLOGIES, INC., Plano, TX (US)

( * ) Notice: Subject to any disclaimer, the term of this patent is extended or adjusted under 35 U.S.C. 154(b) by 370 days.

(21) Appl. No.: 13/831,448

(22) Filed: Mar. 14, 2013

(65) Prior Publication Data

US 2014/0281307 A1  Sep. 18, 2014

(51) Int. Cl.
*G06F 3/06* (2006.01)
*G06F 17/30* (2006.01)
*G06F 11/14* (2006.01)

(52) U.S. Cl.
CPC .............. *G06F 3/065* (2013.01); *G06F 3/0619* (2013.01); *G06F 3/0688* (2013.01); *G06F 11/1402* (2013.01); *G06F 17/30088* (2013.01)

(58) Field of Classification Search
None
See application file for complete search history.

(56) References Cited

U.S. PATENT DOCUMENTS

| | | | |
|---|---|---|---|
| 7,836,226 B2 | 11/2010 | Flynn et al. | |
| 2008/0222219 A1* | 9/2008 | Varadarajan | 707/204 |
| 2010/0049754 A1* | 2/2010 | Takaoka et al. | 707/205 |
| 2010/0281214 A1 | 11/2010 | Jernigan | |
| 2011/0258391 A1 | 10/2011 | Atkisson et al. | |
| 2012/0054152 A1* | 3/2012 | Adkins et al. | 707/623 |
| 2012/0191664 A1* | 7/2012 | Wakrat | G06F 12/0246 707/684 |
| 2013/0024645 A1 | 1/2013 | Cheriton et al. | |
| 2013/0067138 A1* | 3/2013 | Schuette et al. | 711/103 |

* cited by examiner

*Primary Examiner* — Reginald Bragdon
*Assistant Examiner* — Edward Wang
(74) *Attorney, Agent, or Firm* — Kunzler Law Group, PC

(57) ABSTRACT

Techniques are disclosed relating to handling snapshot data for a storage device. In one embodiment, a computing system maintains information that indicates the state of data associated with an application at a particular point in time. In this embodiment, the computing system assigns an epoch number to a current epoch, where the current epoch is an interval between the particular point in time and a future point in time. In this embodiment, the computing system writes, during the current epoch, a block of data to the storage device. In this embodiment, the writing the block of data includes storing the epoch number with the block of data.

21 Claims, 13 Drawing Sheets

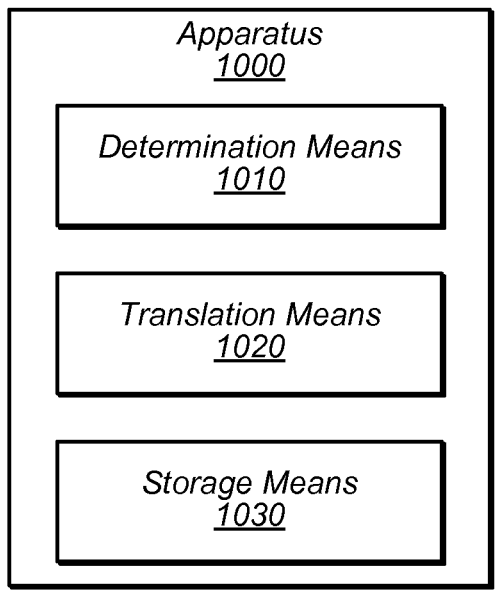
FIG. 10A
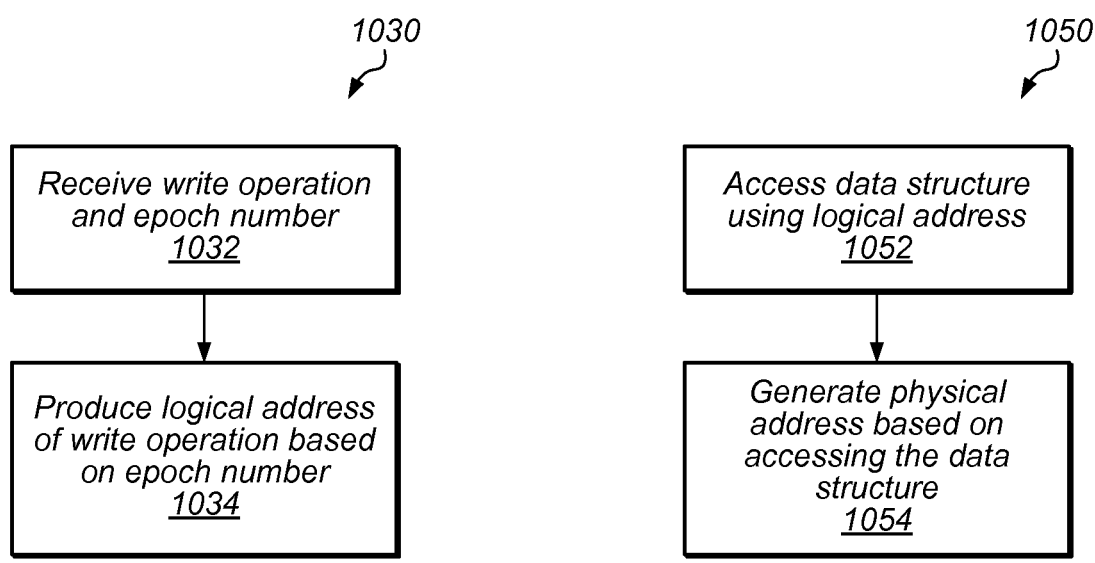
FIG. 10B
FIG. 10C

EPOCH BASED STORAGE MANAGEMENT FOR A STORAGE DEVICE

BACKGROUND

1. Technical Field

This disclosure relates generally to accessing data on a physical recording medium, and more specifically to handling snapshot information on such a medium.

2. Description of the Related Art

Modern storage systems often require various restore capabilities for stored data. Such a restoration may be performed, for example, to facilitate crash recovery in the event of power loss, to recover a last known valid state in the event of data corruption, etc. This functionality may be achieved by taking "snapshots" of data for particular applications such that a snapshot includes information indicating the current state of data for the application at the time the snapshot is taken. For example, taking the snapshot of a database application might include copying the current values of data within the database to an alternate storage.

In the context of flash-based storage, to improve the longevity of memory cells, modern storage systems may implement a log-structured storage to ensure that writes to cells are more evenly distributed across the storage to produce better wear leveling (as opposed to writing particular cells frequently while other cells go unused). When storing data using a log-structure storage, data may be written at an append point that starts at an initial portion in the storage and advances forward as writes are performed. A driver may map logical addresses used by an application to physical locations on a storage device where the data is actually stored, e.g., according to a log-structured implementation.

SUMMARY

The present disclosure describes embodiments of techniques for handling snapshot data for a storage device. These techniques may allow for restoration of data and snapshot data when data corruption occurs. These techniques may allow for efficient storage of snapshot data by storing a delta of information written during an epoch associated with each snapshot.

In one embodiment, a computing system maintains information that indicates the state of data associated with an application at a particular point in time. In this embodiment, the computing system assigns an epoch number to a current epoch, where the current epoch is an interval between the particular point in time and a future point in time. In this embodiment, the computing system writes, during the current epoch, a block of data to the storage device. In this embodiment, the writing the block of data includes storing the epoch number with the block of data.

In another embodiment, an apparatus is disclosed that includes an association module and a storage module. In this embodiment, the associate module is configured to associate a logical address range for a storage device with an epoch number. In this embodiment, the epoch number is associated with write operations to the storage device during a particular epoch. In this embodiment, the storage module is configured to handle one or more storage operations associated with the epoch number using the logical address range. For example, write during an epoch may be associated with the epoch number of the epoch. Read operations may be associated with the current epoch or a particular snapshot.

In yet another embodiment, a non-transitory computer readable medium has program instructions stored thereon. The program instructions are executable by a computing system to cause the computing system to perform operations. The operations include configuring a storage device such that the storage device has a logical address space that is larger than a physical address space of the storage device. The operations further include performing a first write operation during a first epoch using a first logical address range within the logical address space and performing a second write operation during a second, later epoch using a second logical address range within the logical address space.

In yet another embodiment, an apparatus is disclosed that includes first, second, and third means. The first means is for determining a logical address for a write operation based on a current epoch number. The second means is for translating the logical address to a physical address on a storage device. The third means is for storing the current epoch number on the storage device.

BRIEF DESCRIPTION OF THE DRAWINGS

FIG. 10A is a block diagram illustrating another embodiment of an apparatus having a determination means, translation means, and storage means.

FIGS. 10B and 10C are flow diagrams illustrating embodiments of algorithms implemented by a determination means and a translation means.

Figure 1:
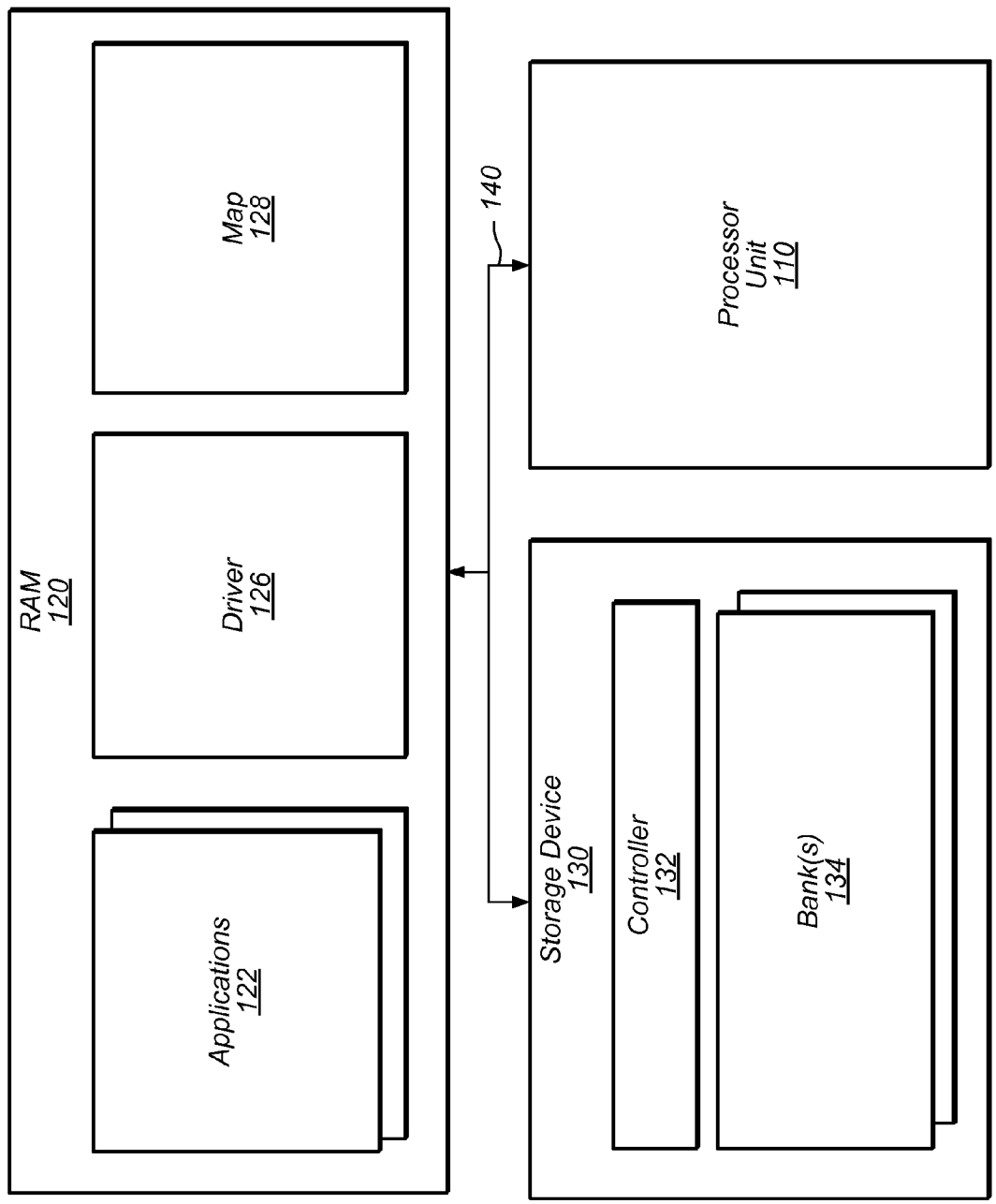
FIG. 1 is a block diagram illustrating one embodiment of a computing system that supports storage snapshots.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

This disclosure also includes and references the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made to these exemplary embodiments, without departing from the scope of the disclosure.

Various units, circuits, or other components in this disclosure may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in a manner that is capable of performing the task(s) at issue. Reciting that a unit/circuit/component is "configured to" perform one or more tasks is expressly intended not to invoke 35 U.S.C. §112, sixth paragraph, for that unit/circuit/component.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Figure 2A:
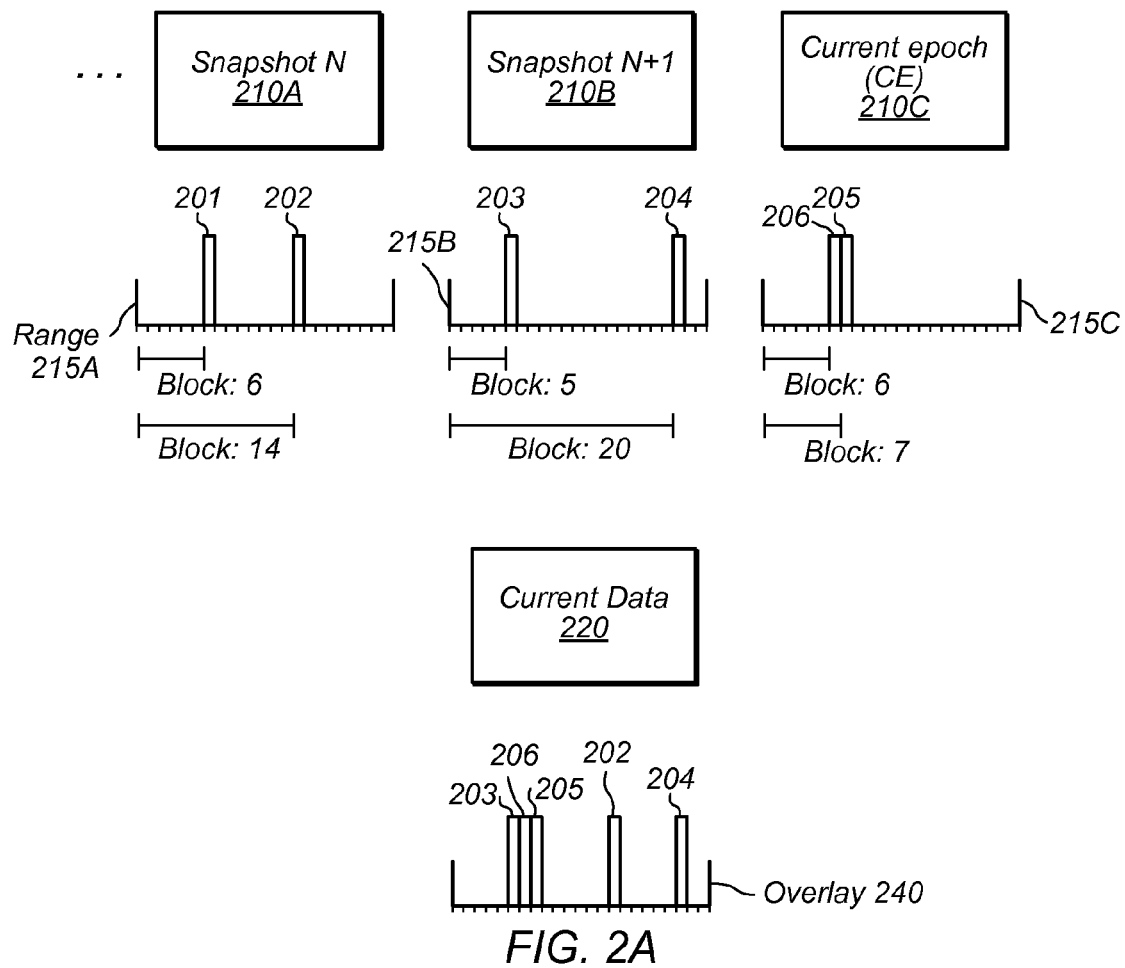
FIG. 2A is a diagram illustrating exemplary snapshot data.
Figure 2B:
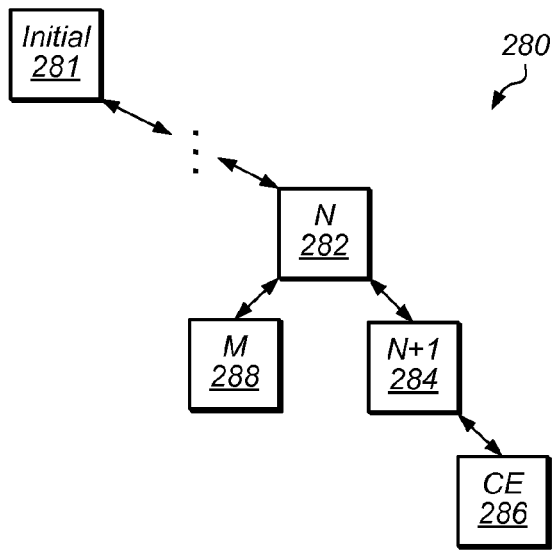
FIG. 2B is a diagram illustrating an exemplary data structure for maintaining relationships between snapshots.

The disclosure initially describes, with reference to FIGS. 1 and 2A-2B, a computing system that handles snapshot data for a storage system. To facilitate this description, logical and physical address spaces associated with the storage device are described with reference to FIGS. 3A-3C. Drivers and map structures usable to handle snapshot data within the storage device are described with reference to FIGS. 4-7. Further embodiments of techniques for handling snapshot data are described in further detail with reference to FIGS. 8-11.

Turning now to FIG. 1, a block diagram of a computing system 100 that supports snapshots is depicted. Computing system 100 may be any suitable type of computing device such as a server, laptop, desktop, a mobile device, etc. In some embodiments, computing system 100 may include multiple computing devices working together. For example, in one embodiment, computing system 100 may be multiple servers coupled together at a data center configured to store data on behalf of multiple clients, such as the storage system discussed below in conjunction with FIG. 11. In the illustrated embodiment, computing system 100 includes a processor unit 110, random access memory (RAM) 120, and storage device 130 coupled together via an interconnect 140. As shown, RAM 120 may include program instructions for one or more applications 122. RAM may include a driver 126 for storage device 130, which, in turn, may include a controller 132 and one or more storage banks 134. RAM 120 may also include a map 128.

In various embodiments, driver 126 is described as having various functionality. This functionality may be implemented in software, hardware or a combination thereof. Such functionality may be implemented within an application 122, in one embodiment. In another embodiment, this functionality may be implemented by software stored within a memory of controller 132 and executed by a processor of controller 132. In still another embodiment, controller 132 may include dedicated circuitry to implement functionality of driver 126. In sum, the depiction of driver 126 as being implemented in RAM 120 should not be seen as limiting, but rather as a depiction of an exemplary embodiment. Similarly, map 128 may be stored in driver 126, controller 132, and/or any other appropriate location.

Storage device 130 is representative of any physical medium upon which data can be recorded. As used herein, the term "recorded" refers broadly to the process of an electronic computing device storing, writing or otherwise transferring one or more data values on to some physical recording medium for subsequent use. Accordingly, a "physical recording medium" is used herein to refer to any medium on which data may be recorded by an electronic computing device. Further, the terms "storage" and "memory" are used herein to be synonymous with "physical recording medium." Given this broad definition, the designations memory (when referring to RAM 120) and storage (when referring to storage device 130) in FIG. 1 and elsewhere in this disclosure may refer to volatile and/or non-volatile media. Such media may also be referred to herein as "memory," and portions of such media may be referred to as "blocks," "cells," "storage blocks," "memory blocks," etc. Collectively, a group of these blocks may be referred to as a "storage array," "memory array," etc.

References in this disclosure to "accessing" data in storage device 130 or "storage requests" to storage device 130 refer to any type of transaction, including writing data to storage device 130 and/or reading data from storage device 130, as well as, TRIM operations, maintenance accesses, discovery accesses, load and store operations under memory semantics, and the like. Further, given the broad definitions of "storage" and "memory" referred to above, these accesses may be applicable to a storage device that has non-volatile memory and/or volatile components.

In some embodiments, storage device 130 may be implemented such that it includes non-volatile memory. Accordingly, in such an embodiment, storage banks 134 may include non-volatile storage devices such as hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writable optical drives (e.g., CD drives, DVD drives, Blu-Ray drives, etc.) etc.

In some embodiments, storage device 130 may be implemented such that it includes non-volatile solid-state memory. Accordingly, in such an embodiment, storage banks 134 may include any suitable type of solid-state storage media including, but not limited to, NAND flash memory, NOR flash memory, nano RAM ("NRAM"), magneto-resistive RAM ("MRAM"), phase change RAM ("PRAM"), Racetrack memory, Memristor memory, nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), etc. In some embodiments, storage banks 134 may include multiple, different types of solid-state storage media.

In other embodiments, storage device 130 may be implemented such that it includes volatile memory. Storage banks 134 may thus correspond to any suitable volatile memory including, but not limited to such as RAM, dynamic RAM (DRAM), static RAM (SRAM), synchronous dynamic RAM (SDRAM), etc. Although shown independently of processor unit 110, in some embodiments, storage device 130 may correspond to memory within processor unit 110 such as one or more cache levels (e.g., L1, L2, L3, etc.) within processor unit 110.

In sum, various functionality will be described herein pertaining to storage device 130. Such functionality may be applicable to any suitable form of memory including both non-volatile and volatile forms. Thus, while particular embodiments of driver 126 are described herein within the context of non-volatile solid-state memory arrays, driver 126 may also be applicable to other recording media such as volatile memories and other types of non-volatile memories, particularly those that include a reclamation process.

Controller 132, in one embodiment, is configured to manage operation of storage device 130. Accordingly, controller 132 may facilitate performance of read operations at specified addresses (e.g., "physical addresses" as discussed below) including selecting the appropriate banks 134 and accessing the data within the appropriate cells within those banks Controller 132 may facilitate performance of write operations including programming of particular cells. Controller 132 may also perform preparation operations to permit subsequent writes to storage device 130 such as, in one embodiment, erasing blocks of cells for subsequent reuse. (The cycle of programming and erasing a block of cells may be referred to as a "PE cycle.") In some embodiments, controller 132 implements separate read and write data pipelines to perform read and write operations in parallel. In one embodiment, controller 132 is also configured to communicate with driver 126 (discussed below) over interconnect 140. For example, in some embodiments, controller 132 communicates information for read and write operations via direct memory access (DMA) transactions coordinated by a DMA controller. Accordingly, controller 132 may support any suitable interconnect type such as a peripheral component interconnect (PCI), PCI express (PCI-e), serial advanced technology attachment ("serial ATA" or "SATA"), parallel ATA ("PATA"), small computer system interface ("SCSI"), IEEE 1394 ("FireWire"), Fiber Channel, universal serial bus ("USB"), etc. In some embodiments, controller 132 may also perform other operations such as error checking, data compression, encryption and decryption, packet assembly and disassembly, etc.

In various embodiments, storage device 130 is organized as a log-structured storage. As used herein, the term "log structure" refers to an arrangement of data on a storage medium in which an append point is used to determine where data is stored; the append point is advanced sequentially through an "address space" as data is stored. A log-structured storage is simply a storage device that is organized using a log structure. The use of a log structure also connotes that metadata is stored in conjunction with the data in order to permit the storage device 130 to be restored to a previous state. Such a restoration may be performed, for example, to facilitate crash recovery in the event of power loss, to recover a last known valid state in the event of data corruption, etc. As used herein, the term "address space" refers to a range of addresses that can be used to specify data within a storage device. As will be described below, a log-structured storage may have both logical and physical address spaces. The term "logical address space" refers to an address space as perceived by higher-level processes even though this address space may not be representative of how data is actually organized on the physical media of storage device 130 or the actual number of physical address locations actually in use, reserved, or allocated to a higher-level process. In contrast, the term "physical address space" refers to the address space used by lower-level processes and may be indicative of how data is organized on the physical media of storage device 130 and the actual number of physical address locations in use by a higher-level process. Embodiments of logical and physical address spaces are discussed in further detail in conjunction with FIGS. 3A and 3B, respectively. One embodiment of a log structure is discussed in conjunction with FIG. 3C.

In various embodiments, using a log structure may permit multiple instances of a set of data to be present in storage device 130 as the data is written, modified, and rewritten to storage. As part of tracking data in a physical address space, older instances of stored data (i.e., those instances that are not the current instance) may be indicated as invalid. For example, in one embodiment, when a value is to be updated, the value may be written at a storage block specified by the current append point (rather than at the location where the value was previously stored). In response to the write being successfully performed, any previously stored instances of that value may be marked as invalid. As used herein, the term "invalid" refers to data that no longer needs to be stored by the system (e.g., because a newer copy of the data exists). Similarly, the term "invalidating" refers to the marking of data as invalid (e.g., storing a record in a data structure) or to the storing of an instance of data when a previous instance of the data existed in storage device 130, the storing making the previous instance invalid.

Map 128, in one embodiment, is used to map (i.e., translate) logical addresses to physical addresses within storage device 130. Accordingly, as data becomes moved and invalidated, it may reside in different physical addresses on storage device 130 over time. Through the use of map 128, however, an application may be able access a most recent set of data by specifying the same logical address (e.g., LBA) even though two or more versions of the data may reside in different physical addresses. Map 128 may be implemented using any suitable data structure. According, in one embodiment, map 128 is a binary-tree data structure. In others embodiments, map 128 may be an array, a linked list, a hash table, etc. In some embodiments, map 128 may be implemented using multiple data structures. Embodiments of map 128 are described in further detail below in conjunction with FIGS. 5 and 6.

Applications 122, in one embodiment, include program instructions that are executable by processor unit 110. As will be described below, applications 122 may utilize various hardware of computing system such as processor unit 110, RAM 120, and storage device 130. An operating system or hypervisor may allocate portions of storage device 130 and/or portions of RAM 120 to applications 122.

Driver 126, in one embodiment, is executable to permit applications 122 to interact with storage device 130. Accordingly, driver 126 may receive requests to perform read and write operations at specified logical block addresses and may issue corresponding commands to controller 132 to implement those operations. In some embodiments, driver 126 manages garbage collection for storage device 130 to reclaim storage blocks with invalid data. As used herein, "reclaiming" a storage block or "reclamation" of a storage block refers to preparing the storage block for reuse (i.e., so that the storage block can store new data). In the case of flash media, reclamation may include copying valid data out of the storage block and erasing the block. In some embodiments, to facilitate performance of read and write operations, driver 126 also maps logical addresses (e.g., LBAs) to corresponding physical addresses (in other embodiments, mapping logical addresses to physical addresses may be performed elsewhere, such as at controller 132). Accordingly, driver 126 may also manage map 128 including adding and removing translations from map 128 as data is manipulated on storage device 130.

In some embodiments, driver 126 is configured to create and handle snapshots for data stored on storage device 130.

Exemplary snapshot data is described below with reference to FIG. 2A. For example, driver 126 may provide a separate logical address range and epoch number for each snapshot. Data stored for each snapshot, in some embodiments, may include or indicate a delta of information written since a previous snapshot. Driver 126 may handle snapshots and epoch numbers for storage requests and translate logical addresses from applications 122 to physical addresses of storage device 130 based on the epoch numbers. The snapshot capability may or may not be transparent to applications 122. For example, in some embodiments, applications 122 may be configured to provide epoch numbers with particular storage requests. In other embodiments, applications 122 may provide storage requests without any knowledge of snapshots or epoch numbers.

In various embodiments, driver 126 presents a logical address space to applications 122. In one embodiment, the size of the logical address space may be equivalent to the size of the physical address space on storage device 130. For example, if storage device 130 has a 1.2 TB capacity addressable using a 32-bit physical address space, driver 126 may present a 32-bit logical address space to the operating system. In another embodiment, driver 126 presents a logical address space that is larger than the physical address space of storage device 130. In such an embodiment, applications 122 may be described as being "thinly provisioned" as they are given more resources (e.g., storage capacity) than actually exists—thus, applications 122 cannot collectively consume the entire logical address space (without adding additional capacity) as this would overload the storage capacity of storage device 130. Still further, in other embodiments, driver 126 may provide a logical address space that is significantly larger than the physical address space of a storage device such that the logical address space is a "sparse address space." (For the purposes of this disclosure, a sparse address space is any logical address space that is at least 10% larger than the physical address space of a storage device.) For example, in one embodiment, driver 126 may present a 48-bit sparse address space relative to a 32-bit physical address space. In such an embodiment, a given application 122 may consume considerably less than its total allocated LBA range such that considerable unused portions of logical address space may exist between one application 122's stored data and another application 122's data. Driver 126 may determine the size of the logical address space to be presented based on any suitable criteria.

In various embodiments, allocating ranges of a larger logical address space may be advantageous because it reduces the possibility of collisions within the logical address space (e.g., applications 122 inadvertently accessing the same LBA). Allocated ranges may also be static, continuous, and non-overlapping to reduce the possibility of collisions. Still further, through the usage of map 128, driver 126 may reduce the possibility of collisions within the physical address space without relying on an operating system to prevent potential collisions.

Further, sparse addressing may allow for a larger number of snapshots relative to the actual available physical storage space. For example, less than the entire address range of a snapshot will typically be written during each epoch, so a physical address space may be smaller than the logical address space allocated to snapshots.

Turning now to FIG. 2A, a diagram illustrating exemplary snapshot data is shown. In the illustrated embodiment, snapshots 210A-C are each associated with a respective one of logical address ranges 215A-C, which are each used for write operations during a particular epoch. As used herein, the term "epoch" refers to an interval between two events in time. Events may include snapshot events (e.g., creation, deletion, or merging of a snapshot), system events (e.g., power on, restart), particular points in time, etc. Epochs are often bounded by two consecutive snapshots. However, an "initial epoch" ends when a first snapshot occurs for a particular application, and may not be initially bounded by a snapshot (e.g., the initial epoch may start with an empty drive). Similarly, a "current epoch" occurs while performing storage requests after a previous snapshot, but is bounded by a present point in time rather than a snapshot until a subsequent snapshot occurs. Thus, storage requests to a storage range that implements snapshots occur during a particular epoch, which may be an initial epoch, a current epoch, or an epoch that is bounded by snapshots. Epochs may or may not be non-overlapping. For example, two epochs may overlap in the context where multiple child snapshots are created based on the same parent snapshot.

Further, as used herein, the term "snapshot" refers to the state of data associated with an application at a particular point in time. The term "snapshot data" refers to information that is stored to record and indicate a snapshot. Snapshot data may include metadata, mapping data, data itself, etc. in order to indicate the state of a storage device at a given time. For example, if snapshot data is generated for a particular application at time T1, the snapshot data can later be used at time T2 to recover data from time T1, even some of the data from T1 has been overwritten by the application at time T2. An initial snapshot may refer to an empty drive, which may be a logical address range with no valid data. Further, the phrase "creating a snapshot" refers to instantiating snapshot data. For example, creating a snapshot may include recording which data of the snapshot was written during a preceding epoch, pointing to data written during previous epochs, and/or allocating a new logical address range for data written during a current epoch that follows creation of the snapshot.

Driver 126, in various embodiments, is configured to assign a logical address range 215 to each epoch. In one embodiment, the logical address range for an initial epoch (not shown) is presented to an application. In this embodiment, the application may continue to use the logical address range of the initial epoch and may be unaware of other logical address ranges. Each logical address range may be located at a particular offset from the logical address range initially allocated to an application, and logical addresses from the application may be shifted based on epoch numbers in order to use the appropriate logical address range. In some embodiments, each logical address range 215 is the same size as the address space that is allocated to a particular application. An application may be unaware of the different logical address ranges 215, and may read and write from a single address range. Storage requests from the application may be directed to a particular logical address range 215 based on an epoch with which the logical address ranges 215 are associated.

In the illustrated example, data blocks 201 and 202 were written at blocks 6 and 14 of logical address range 215A during an epoch that preceded creation of snapshot N. Similarly, blocks 203 and 204 were written at blocks 5 and 20 of logical address range 115B during an epoch between creation of snapshot N and creation snapshot N+1, and blocks 205 and 206 were written at blocks 6 and 7 of logical address range 215C during the current epoch that began after snapshot N+1 was taken. Driver 126, in various embodiments, is configured to translate logical addresses in logical address ranges 215 to physical addresses on storage device 130. As described below with reference to FIG. 3A, physical blocks corresponding to the logical addresses in logical address ranges 215 may be located at various different locations in a physical address space.

Thus in certain embodiments, for a given storage request, driver 126 may perform two translations: (1) a translation from an application's address to a logical address for the appropriate epoch and (2) a translation from the logical address for the epoch to a physical address.

In the illustrated embodiment, current data 220 is a conceptual overlay of data indicated by previous snapshot data. In this embodiment, snapshot data for a given snapshot indicates writes that occurred since the previous snapshot. To read current data, in one embodiment, driver 126 is configured to check a logical address range associated with a current epoch (logical address range 215C in this example). If no translation exists for a block in the logical address range of the current epoch, (e.g., because the block has not been written during the current epoch), driver 126 is configured to examine the logical address ranges of one or more ancestor snapshots to find the data. This would occur when the block has not been written during the current epoch, for example. For example, when searching for the data at block 20, driver 126 would stop when detecting block 204 in snapshot N+1. Note that in the example of FIG. 2A, block 206 "overwrites" block 201 at block 6 from the point of view of an application. Thus, block 206 would be read in response to a request for data from block 7 from current data and block 201 would be read in response to a request for data from block 7 from snapshot N+1. For a block at block 3, for example, driver 126 may find the data in a snapshot previous to snapshot N, because the data does not have a translation for any of the snapshots shown.

In various embodiments, driver 126 is configured to assign an epoch number to each epoch. The epoch number may be used to identify the logical address range associated with an epoch. Driver 126 may handle shifting or adjusting addresses from an application to the appropriate logical address range based on these epoch numbers. Driver 126 may implement a counter to generate epoch numbers. The counter may wrap when it reaches a greatest representable value, making the number of snapshots available dependent on the number of bits used for the counter. In some embodiments, epoch number zero is associated with an initial snapshot which refers to an all-empty drive.

In some embodiments, driver 126 is configured to store an epoch number on storage device 130 at one or more locations that are associated with blocks written during the particular epoch. In one embodiment, as described below with reference to FIG. 3B, driver 126 is configured to store epoch numbers in metadata for each block (and/or for larger or smaller storage structures associated with each block). Each block may be a packet (described below with reference to FIG. 3B) or a larger data block. Driver 126 may also store epoch information in map 128 and/or other data structures for translating logical addresses to physical addresses.

Driver 126, in one embodiment, is configured to create snapshots for applications at regular intervals. Alternatively or additionally, driver 126 may be configured to create snapshots based on requests by an application or operating system. The data included in a snapshot may be an entire logical address range available to an application, or some portion thereof. In some embodiments, an application may read from a particular epoch by providing an epoch number to driver 126. In other embodiments, an application does not have access to epoch numbers and only sees data associated with overlay 240 unless a restoration of a previous snapshot occurs. In some embodiments, mapping of logical address ranges 215 to physical addresses may persist for all snapshots that have not been deleted, allowing for easy rollback to a previous snapshot.

Driver 126 may delete snapshot data by issuing a TRIM command for the logical address range associated with the snapshot. Performing a TRIM command may include updating or removing nodes in map 128 associated with the logical address range and marking associated data stored on the storage device as invalid. A garbage collector may eventually re-use the physical locations associated with invalid data for new data. Thus, the data may be marked as invalid, but may not be deleted immediately. In some embodiments, driver 126 may wait to deleting data for a snapshot with multiple children until all blocks in its logical address range that have translations to physical addresses have been overwritten by the child snapshots, e.g., in order to avoid duplicating data.

Turning now to FIG. 2B, one embodiment of a data structure 280 for maintaining snapshot data is depicted. In the illustrated embodiment, nodes 281-288 in data structure 280 are each associated with a snapshot and contain references to respective parent and child snapshots. Each node may include information associated with the logical address range assigned to a snapshot, such as the bounds of the range, an offset associated with the range, or a pointer to information about the range, e.g., in map 128. Each node may also include information about what blocks in the logical address range are valid. A logical address may be described as "valid" with respect to a snapshot when it is translatable to a corresponding physical address at which the data is stored, e.g., because the data was written during an epoch associated with the snapshot. In some embodiments, this validity corresponds to whether there is currently a physical address mapped to the logical address. In one embodiment, a particular logical address is implicitly invalid if there is no node in map 128 associated with the logical address.

Node 281, in the illustrated embodiment, corresponds to an initial snapshot, which may represent an empty drive. Node 281's descendants include nodes for snapshot N, snapshot N+1 and the current epoch (CE). Node M 288, in the illustrated embodiment, is another child node of node N+1 and is included to show that a snapshot may have multiple child snapshots. In the illustrated embodiment, each node includes references to both parent and child nodes (if existing), but in other embodiments, data structure 280 may include references in only one direction. In some embodiments, all snapshots for a particular data range share an oldest ancestor snapshot (e.g., initial snapshot 281 of FIG. 2B). Speaking generally, a "child snapshot" records data during an epoch immediately following creation of a "parent snapshot." Such parent/child relationships may be maintained using data structure 280 and/or some other structure.

Finding current data for a read operation may involve traversal of multiple nodes in the tree. For example, if a particular block is not valid in nodes 284 or 286, a read may occur from snapshot N 282. In some embodiments, driver 126 is configured to collapse the tree in order to improve efficiency. For example, driver 126 may merge parent snapshot data into its child by writing any current data from the parent snapshot forward and associating it with the child snapshot's epoch number. Merging snapshots may involve resolving conflicts between snapshots (e.g., when two snapshots include different data for the same block) using older or younger data in various configurations. In one embodiment, data from a younger snapshot is used when there is a conflict during merging. If a parent snapshot has multiple children, driver 126 may delete one or more of the children before performing such a merge, e.g., in order to prevent duplication of data.

Driver 126 may be configured to add a node to data structure 280 each time a snapshot is created and remove nodes from data structure 280 when snapshots are deleted. Driver 126 may balance data structure 280 in order to optimize access times.

Various optimizations may be implemented for performing read operations using data structure 280 and/or map 128. Speaking generally, driver 126 provides two keys (a logical address and an epoch number) to access a desired physical address on storage device 130. Thus, various optimizations used for databases that are accessed with multiple keys may be applied to driver 126.

In one embodiment, driver 126 is configured to maintain a unique forward map for the current epoch. This unique forward map may map logical address ranges to the epoch number in which they were written. For example, for the current epoch, this unique forward map may indicate, for each block in the logical address range, which snapshot holds valid data for the block. This implementation may improve access times by preventing traversals through multiple nodes to find current data.

In another embodiment, driver 126 may include reference data in map 128 that points to an epoch that contains valid data for a given block. For example, if data for a particular epoch does not contain a translation for a particular block, map 128 would include a reference to the epoch that contains the current data for the block. This implementation may reduce traversals of the map to two lookups at most but may increase the size of map 128.

In the illustrated embodiment, data structure 280 is a tree, but in other embodiments data structure 280 may be stored as an array, a linked list, a hash table, etc. Driver 126 may store data structure 280. In other embodiments, driver 126 may handle snapshot data without data structure 280, e.g., by using epoch numbers to access and update map 128. In some embodiments, driver 126 includes additional data structures (not shown) for optimizing storage requests associated with snapshots. Data structure 280 and map 128 may be separate, may be combined, and/or may reference each other, in various embodiments.

Figure 3A:
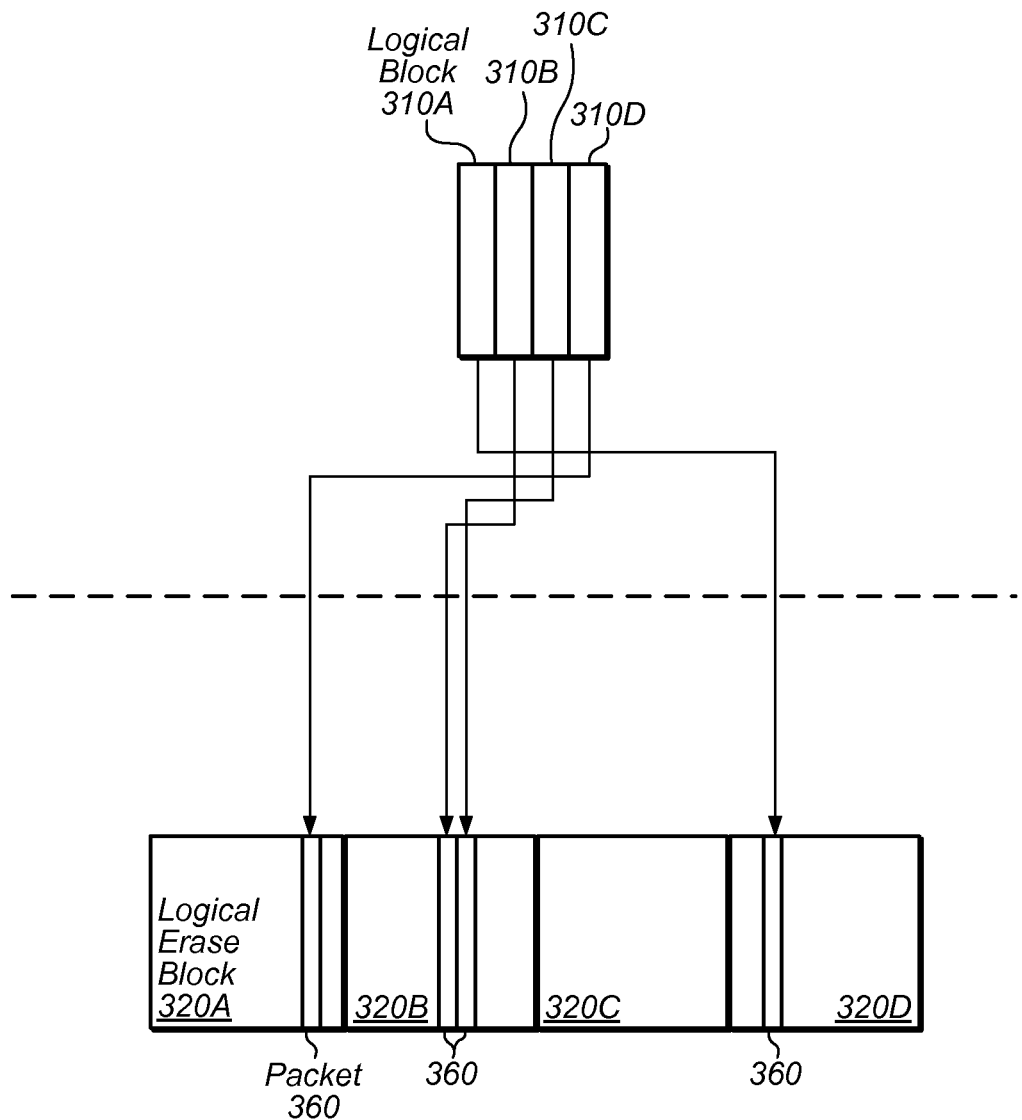
FIGS. 3A-3C are block diagrams illustrating embodiments of logical and physical address spaces.

Turning now to FIG. 3A, an exemplary mapping of a logical address space 302 to a physical address space 304 is depicted. In one embodiment, logical address space 302 represents the organization of data as perceived by higher-level processes such as applications 122. In one embodiment, physical address space 304 represents the organization of data on the physical media.

Logical address space 302, in one embodiment, is divided into logical addresses corresponding to respective logical blocks 310A-310D (also referred to as sectors). In some embodiments, the logical addresses are LBAs (in other embodiments, the logical addresses may correspond to some other form of logical identifiers). In one embodiment, sectors/blocks 310 represent the smallest block of data associated with a given logical address. As but one example, a block 310 may be approximately 512 bytes in size (while logical erase blocks and logical pages discussed below may be approximately 40 MB and 8 kB, respectively).

Physical address space 304, in one embodiment, is divided into physical addresses corresponding to the arrangement of data on the physical recording media. As will be discussed in further detail with respect to FIG. 3B, in one embodiment, the content of logical blocks 310 may be stored as packets 360 within logical erase blocks 320. As discussed with respect to FIG. 3C, in various embodiments, physical address space 304 may be organized as a log structure, in which write operations may be performed at only one or more append points.

Figure 3B:
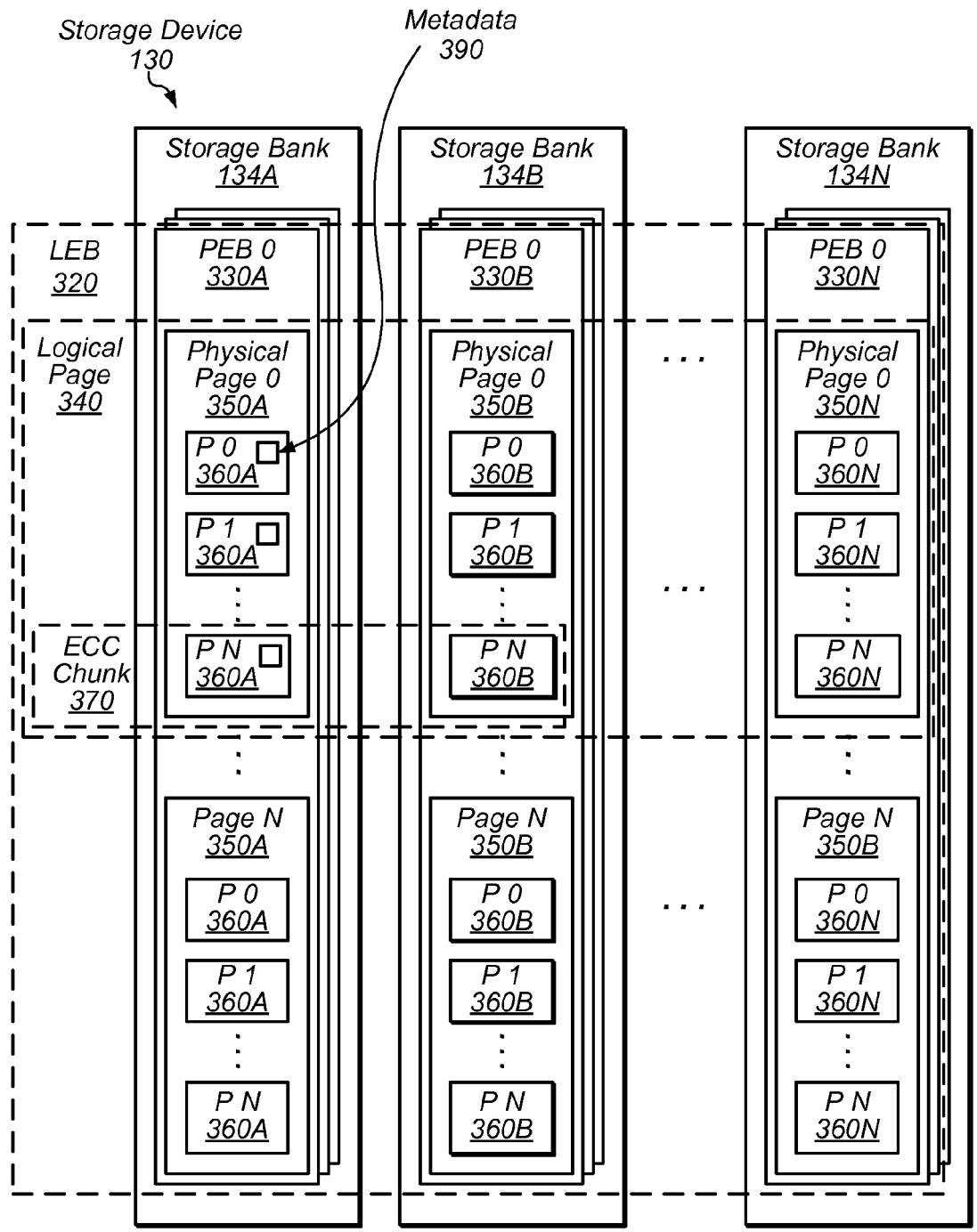

Turning now to FIG. 3B, a block diagram of storage blocks within storage device 130 is depicted. In the illustrated embodiment, storage device 130 is organized into logical erase blocks (LEBs) 320 that include multiple physical erase blocks (PEBs) 330, which are located in separate storage banks 134. A logical erase block 320 is further divided into multiple logical pages 340 (not to be confused with virtual memory pages) that, in turn, include multiple physical pages 350. Pages 350 include multiple packets 360, which may be grouped into ECC chunks 370.

As used herein, the term "erase block" refers broadly to a logical erase block or a physical erase block. In one embodiment, a physical erase block 330 represent the smallest storage block with a given bank 134 that can be erased at a given time (e.g., due to the wiring of cells on the die). In one embodiment, logical erase blocks 320 represent the smallest block erasable by controller 132 in response to receiving an erase command. In such an embodiment, when controller 132 receives an erase command specifying a particular logical erase block 320, controller 132 may erase each physical erase block 330 within the block 320 simultaneously. It is noted that physical erase blocks 330 within a given logical erase block 320 (e.g., blocks 330A and 330B) may be considered as contiguous in physical address space 304 even though they reside in separate banks 134. Thus, the term "contiguous" may be applicable not only to data stored within the same physical medium, but also to data stored within separate media.

In one embodiment, a physical page 350 represents the smallest storage block within a given bank 134 that can be written to at a given time. In one embodiment, a logical page 340 is the smallest writable storage block supported by controller 132. (In one embodiment, controller 132 may include a buffer configured to store up to a logical page worth of data; upon filling the buffer, controller 132 may write the contents of the buffer to a single logical page simultaneously.) In some instances, dividing a logical page 340 across multiple banks 134 may result in faster access times for a set of data when multiple banks 134 are accessed in parallel.

In one embodiment, a packet 360 represents the smallest storage block within a given bank 134 that can be read at a given time. In one embodiment, an ECC chunk 370 is the smallest storage block readable by controller 132. In some embodiments, packets 360 may be slightly larger than logical blocks 310 as they may include the contents of a logical block 310 (or multiple blocks 310 in some instances) as well as a packet header.

In some embodiments, driver 126 may associate metadata 390 with one or more of storage blocks 320-370. As used herein, the term "metadata" refers to system data usable to facilitate operation of solid-state storage device 130; metadata stands in contrast to, for example, data produced by an applications (i.e., "application data") or forms of data that would be considered by an operating system as "user data." For example, in one embodiment, a logical erase block 320 may include metadata specifying, without limitation, usage statistics (e.g., the number of program erase cycles performed on that block 320), health statistics (e.g., a value indicative of how often corrupted data has been read from that block 320), security or access control parameters, sequence information (e.g., a sequence indicator), a persistent metadata flag (e.g., indicating inclusion in an atomic storage operation), a transaction identifier, or the like. In one embodiment, the header within a packet 360 may include packet metadata such as one or more LBAs associated with the contained data, the packet size, linkages to other packets, error correction checksums, etc. In various embodiments, driver 126 may use this information, along with other forms of metadata, to manage operation of storage device 130. For example, driver 126 might use this information to facilitate performance of read and write operations, recover storage device 130 to a previous state (including, for example, reconstruction of various data structures used by driver and/or replaying a sequence of storage operations performed on storage device 130), etc.

In one embodiment, driver 126 is configured to store an epoch number in metadata 390 for each packet that is part of a snapshot range. In this embodiment, the epoch number corresponds to an epoch during which the packet was written. In other embodiments, epoch numbers may be stored on storage device 130 and associated with other granularities. For example, an epoch number may be stored with each logical page visible to an application. As further examples, an epoch number may be written with each ECC chunk, each LEB, or any of various appropriate storage unit sizes. Metadata 390 may also include the logical address associated with each write operation. Driver 126 may use metadata 390 to determine when snapshot data should be merged or deleted, to reconstruct data structures (e.g., data structures that maintain relationships between snapshots), and restore storage device 130 to a previous state associated with a previous snapshot, e.g., when such data structures have been corrupted.

Figure 3C:
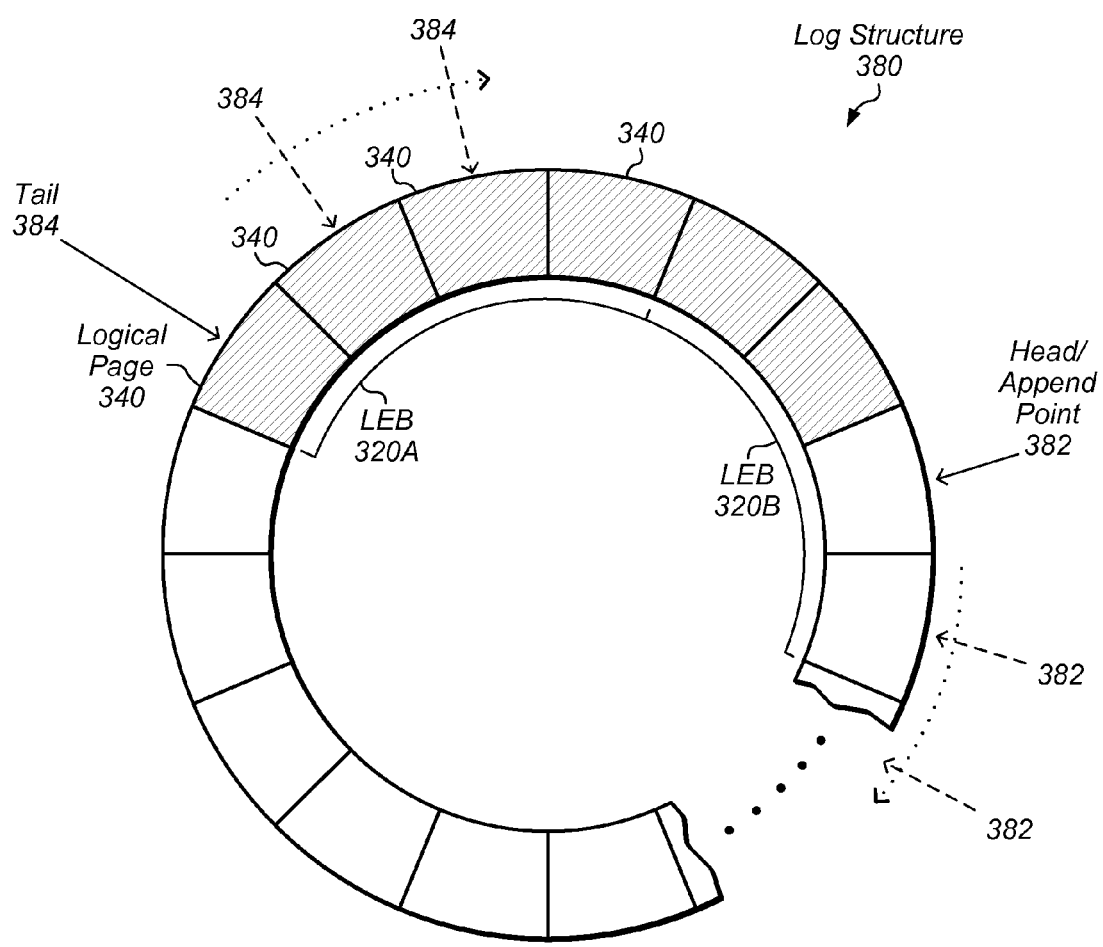

Turning now to FIG. 3C, a block diagram of log structure 380 within physical address space 304 is depicted. As shown, in various embodiments, data is stored sequentially at an append point 382 (also referred to as the "head") that starts an initial logical page 340. As additional data is stored, append point 382 advances to subsequent pages 340 in log structure 380. Eventually, after storing enough data, the append point 382 reaches the "last" page 340 in storage device 130, at which point the append point 382 wraps back to the initial page 340. Thus, log structure 380 is depicted as a loop/cycle. As more data is stored, the number of available pages 340 (shown as unshaded pages 340) decreases and the number of used pages 340 (shown as shaded pages 340) increases. As discussed above, in order to reuse these pages 340 (i.e., make them available to receive further writes), in one embodiment, driver 126 performs erase operations on logical erase blocks 320. In one embodiment, a tail 384 is maintained to identify the oldest page 340 still in use within structure 380 (pages other than the one located at the tail are considered to be younger than the tail). When the logical erase block 320 with the oldest page 340 is eventually erased, tail 384 is advanced forward to the next oldest page 340 in use at the end of log structure 380.

In general, data that is modified less frequently than other data in storage device 130 will migrate towards tail 384 (such data may be described as having a "colder temperature" or simply as "cold data"). On the other hand, data that is modified more frequently (described as having a "hotter temperature" or as "hot" data) will typically be located closer to head 382. Thus, valid data located in LEB 320A is likely "colder" than data in LEB 320B.

It is noted that, in other embodiments, storage device 130 may be organized in a non-log-structured format. As used herein, the term "strict log structure" refers to a structure in which write operations may be performed at only one append point, and are not allowed to "fill in" at locations behind the append point.

Figure 4:
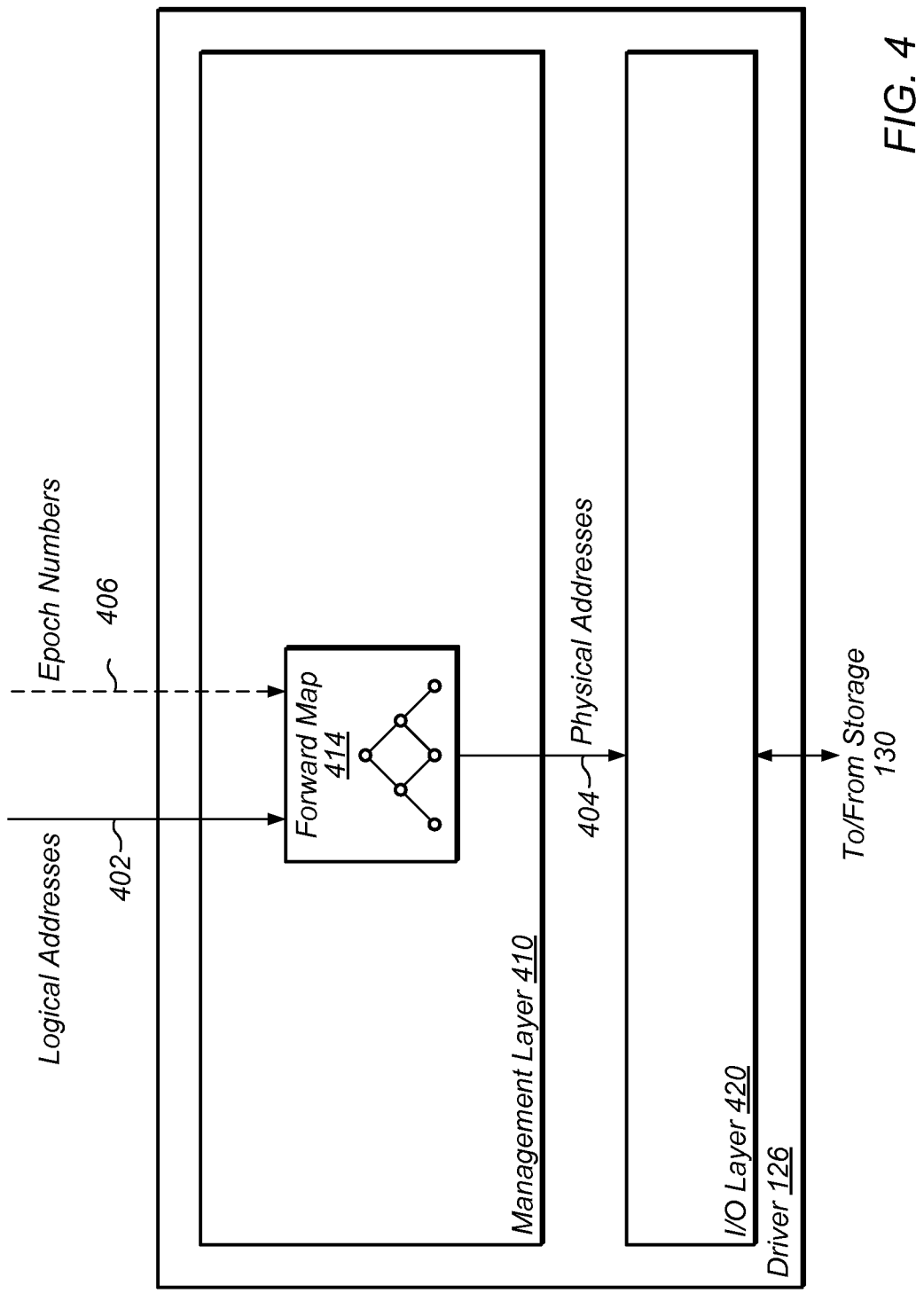
FIG. 4 is a block diagram illustrating one embodiment of a driver for the storage device.

Turning now to FIG. 4, a block diagram illustrates one embodiment of driver 126. As noted above, in one embodiment, driver 126 is executable to enable applications 122 to interact with storage device 130. In the illustrated embodiment, driver 126 includes a management layer 410 and an input/output (I/O) layer 420.

Management layer 410, in one embodiment, handles higher-level block-related operations for driver 126. Accordingly, in various embodiments, management layer 410 tracks the mapping of logical addresses 402 to physical address 404, and performs translations for addresses 402 received from higher-level processes such as those of applications 122 and/or an OS. In some embodiments, management layer 410 also performs garbage collection, e.g. using a groomer. In some embodiments, management layer 410 maintains various forms of metadata in one or more data structures located within RAM 120 such as forward map 414, program erase (PE) statistics, health statistics, etc. (In other embodiments, data structures associated with driver 126 may be maintained elsewhere in system 100 such as within storage device 130.) In one embodiment, driver 126 periodically stores copies of these data structures to storage device 130 so that they can be reconstructed in the event of a crash.

Forward map 414, in one embodiment, is a forward mapping data structure usable to map a logical address space to a physical address. Forward map corresponds, in some embodiments, to map 128. In some embodiments, forward map 414 may include metadata in addition to metadata used to facilitate mapping such as invalidity information. Although described as "forward" map, map 414 may also be used to perform a reverse mapping of a physical address to a logical address. As will be described in conjunction with FIGS. 5-6, in one embodiment, forward map 414 is implemented as an extended-range b-tree data structure. In other embodiments, forward map 414 may be implemented using other data structures such as arrays, hash tables, other forms of trees, etc. In some embodiments, forward map 414 may also be implemented as multiple data structures such as a tree with pointers into an array.

In the illustrated embodiment, forward map 414 is also configured to receive epoch numbers 406. In some embodiments, epoch numbers 404 are encoded in logical addresses 402. For example, the epoch numbers 406 may be included in the higher-order bits of logical addresses 402. As another example, epoch numbers 404 may be encoded using a hash function or any of various appropriate algorithms for encoding an epoch number in a range of addresses. In other embodiments, epoch numbers 406 are provided separately from logical addresses 402. Epoch numbers may be generated by driver 126 itself (e.g., using the current epoch) or may be received from an application (e.g., in order to access data from a previous snapshot). In some embodiments, forward map 414 is configured to generate physical addresses based on both logical addresses 402 and epoch numbers 406.

I/O layer 420, in one embodiment, handles lower-level interfacing operations with controller 132. Accordingly, layer 420 may receive a write request or a read request and the physical address 404 for that request; layer 420 may then issue the appropriate commands to controller 132 to cause storage device 130 to fulfill that request. In some embodiments, I/O layer 420 may prepare data for DMA transactions and initialize a DMA controller to conduct the transactions.

Figure 5:
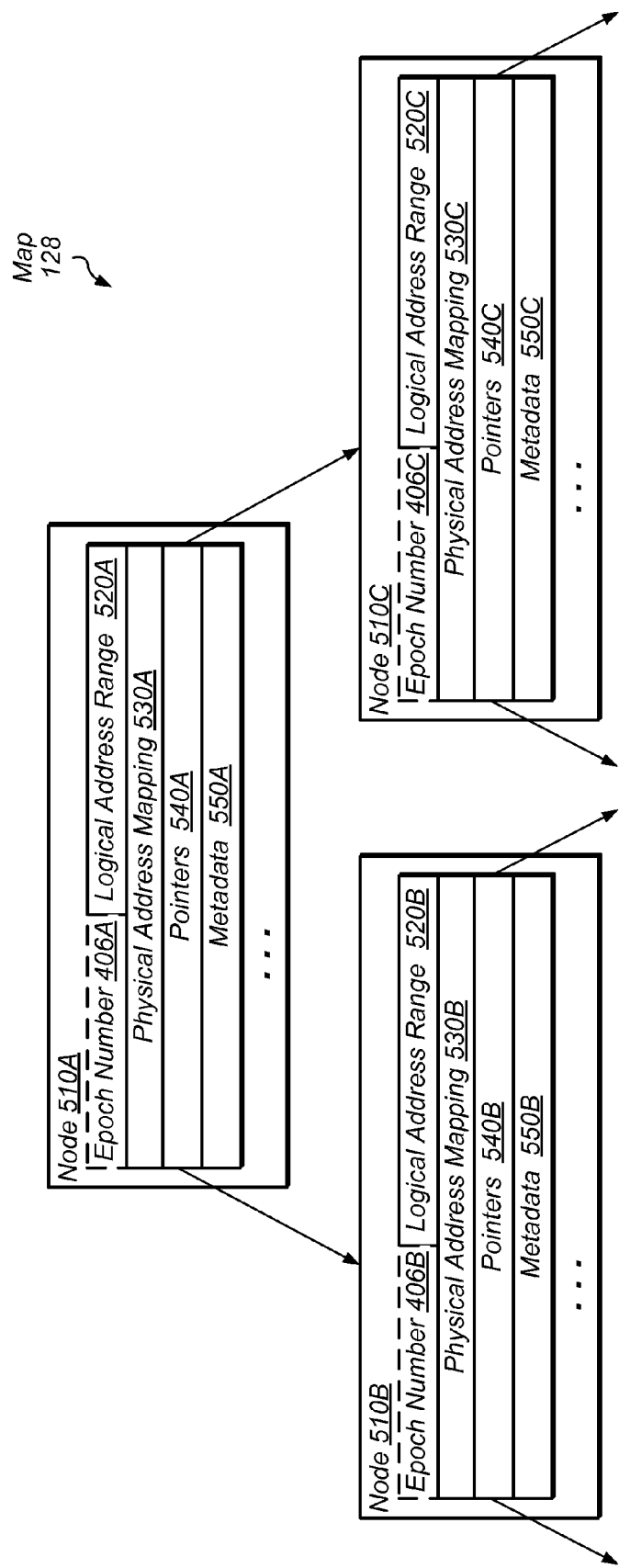
FIG. 5 is a block diagram illustrating one embodiment of a map data structure.

Turning now to FIG. 5, a block diagram of map 128 is depicted. In illustrated embodiment, map 128 is an extended-range b-tree that includes multiple nodes 510A-C. As shown, each node 510 includes a logical address range 520, a physical address mapping 530, one or more pointers 540, additional metadata 550, and an epoch number 406.

In one embodiment, driver 126 is configured to allocate a new node in map 128 when a snapshot is created and the current epoch begins. The node may include a logical address range that points to the entire logical address range associated with the current epoch. As data is written during the current epoch, the node may be divided up into multiple other nodes for smaller logical address portions within the range for the current epoch (see FIG. 6, for example).

Logical address range 520, in one embodiment, is the range of logical addresses (e.g., LBAs) that are mapped using information within a given node 510. Accordingly, logical address range 520A specifies that physical address mapping 530A pertains to LBAs 50-100, for example. If a logical address does not "hit" in a node 510 (i.e., does not fall within a range 520 of a node such as range 520A in root node 510A), then map 128 is traversed to examine ranges 520 in one or more leaf nodes such as nodes 510B or 510C. In one embodiment, map 128 includes a node 510 for each range of logical addresses that have been mapped to a corresponding range of physical addresses, but does not include nodes 510 corresponding to unmapped ranges. Thus, in such an embodiment, if a given LBA is unused, unallocated, and/or unwritten, a corresponding node 510 does not exist for that LBA in map 128. On the other hand, if an LBA has been written to, map 128 includes a node 510 specifying range 520 that includes the LBA. As such, nodes 510 may be added and/or modified when data is written to storage device 130. In such an embodiment, map 128 is also a sparse data structure, meaning that map 128 does not include mappings for an entire logical address space. Accordingly, in some embodiments, logical address space 302 may be significantly larger than physical address space 304.

Physical address mapping 530, in one embodiment, is the mapped physical addresses for a given range 520. In one embodiment, a given physical address is a composite a bank identifier for a storage bank 134, a PEB identifier for a PEB 330, a physical page identifier for a page 350, and a packet identifier for a packet 360; however in other embodiments, a physical address may be organized differently (e.g., a composite of LEB, logical-page, and ECC-chuck identifiers). In one embodiment, physical address mapping 530 is specified as a range of physical addresses. In another embodiment, physical address mapping 530 is a base address that is combined with an offset determined from the logical address. In other embodiments, mapping 530 may be specified differently.

Pointers 540, in one embodiment, identify leaf nodes 510 for a given node 510. In some embodiments, map 128 is organized such that a left pointer identifies a node 510 that has a lower address range 520 than the present node 510 and a right pointer may identify a node 510 having a higher address range 520. For example, if node 510A corresponds to the logical address range 50-100, node 510B may correspond to the range 0-50 and node 510C may correspond to the range 100-150. In some embodiments, map 128 may also be periodically balanced to give it a logarithmic access time.

Metadata 550, in one embodiment, is additional metadata that may not be used in mapping a logical address to physical address such as validity information and packet size. In one embodiment, validity information may identify whether particular locations (e.g., erase blocks, pages, or packets) store valid or invalid data. In some embodiments, metadata 550 may also include TRIM notes indicative of data that was invalidated in response to TRIM commands (in other embodiments, TRIM notes may be stored in a separate data structure within RAM 120, or on storage device 130). In some embodiments, storage device 130 may support variable packet sizes; in such an embodiment, metadata 550 may specify the size packets used for a given logical address range 520. In some embodiments, metadata 550 may also include other information such as age information, snapshot data, usage information (e.g., whether particular logical addresses are associated with hot or cold data), etc.

Epoch number 406, in one embodiment is the epoch number associated with logical address range 520 (which may be all or a portion of a logical address range 215, for example). In one embodiment, epoch number 560 is encoded in the upper bits of logical addresses. In another embodiment, epoch number 406 is included in metadata 550. In still other embodiments, nodes in map 128 may not include epoch numbers and epoch numbers may be handled by other modules of driver 126.

In some embodiments, driver 126 provides both an epoch number and a logical address to map 128. As mentioned above, the epoch number may be encoded in the address, in some embodiments. Map 128, in the illustrated embodiment, is configured to produce a physical address of storage device 130 in response to the received epoch number and logical address.

In one embodiment, driver 126 is configured to determine whether the snapshot data associated with the epoch number contains a translation to a physical address for the logical address before accessing map 128 (e.g., using data structure 280). In this embodiment, driver 126 traverses map 128 to find the logical address and uses physical address mapping 530 to obtain the associated physical address. In another embodiment, driver 126 is configured to access map 128 before it has determined whether the snapshot data associated with the epoch number contains valid data for the logical address. In this embodiment, driver 126 may determine that the snapshot data associated with the epoch number does not contain valid data at the logical address based on metadata 440. In this situation, driver 126 may be configured to re-traverse map 128 using a new logical address and/or new epoch number in order to access a node associated with a parent snapshot until a snapshot with valid data at the desired location is found.

Figure 6:
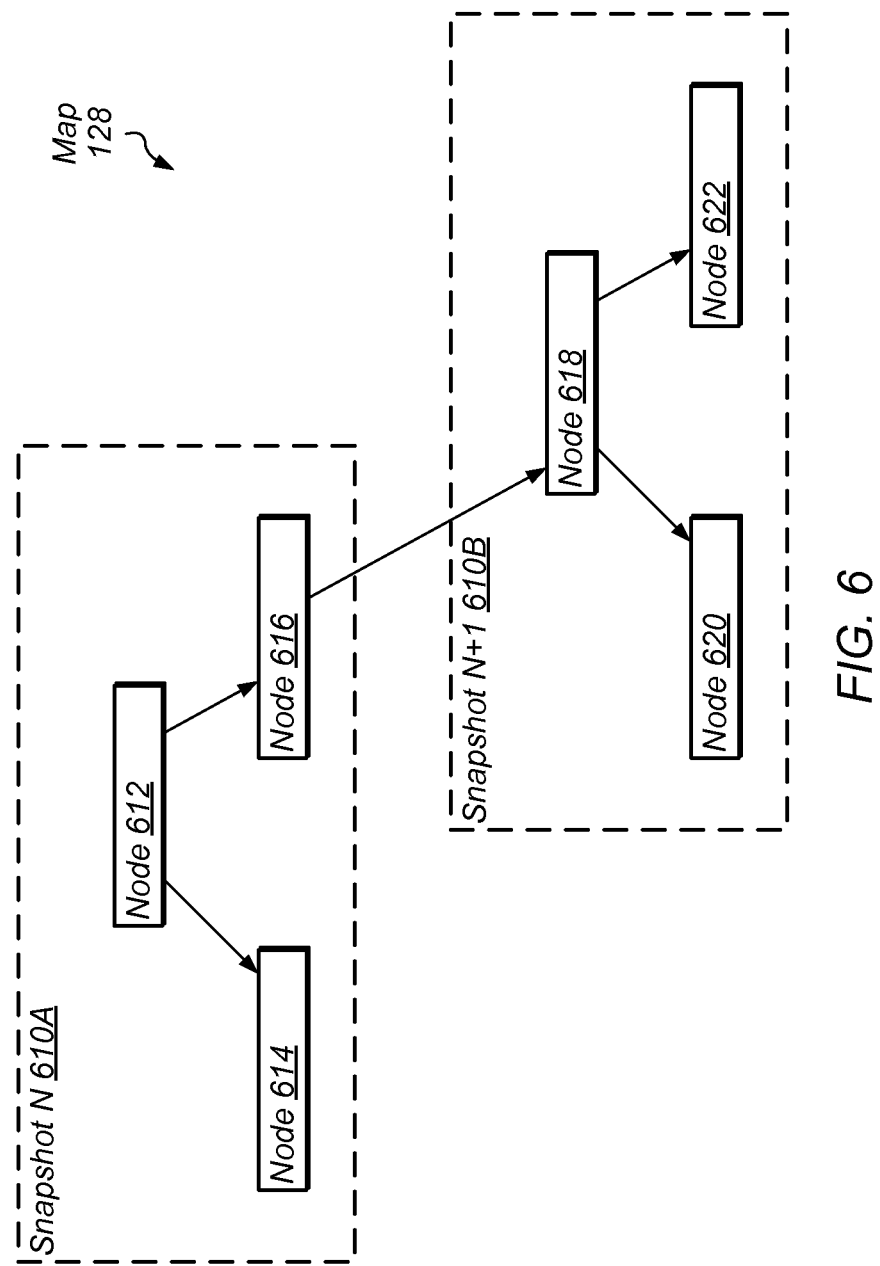
FIG. 6 is a block diagram illustrating another embodiment of a map data structure.

Turning now to FIG. 6, another embodiment of map 128 is depicted. In the illustrated embodiment, epoch numbers are encoded in logical addresses (e.g., in the upper bits). In this embodiment, driver 126 may not include a separate data structure 280 for maintaining parent-child relationships between snapshots. In the illustrated embodiment, map 128 includes nodes 612-622 which are allocated among two snapshots 610.

In the illustrated embodiment, nodes 612-622 are associated with snapshots based on bits of their address ranges (e.g., in higher-order bits of each address). Thus, a given snapshot may be associated multiple nodes in map 128 that encode the epoch number of the snapshot in their logical address range 520.

Consider a situation in which snapshot N+1 610B is a child of snapshot N 610A. Driver 126 accesses map 128 using a logical address that encodes an epoch number. If the node in the current snapshot N+1 associated with the logical address (e.g., node 618) does not contain a valid entry, driver 126, in one embodiment, is configured to apply an offset to the logical address. In this embodiment, driver 126 would apply the offset such that a new logical address would include snapshot N's epoch number and re-traverse map 128 in order to determine whether parent snapshot N included valid data for the new logical address.

Figure 7:
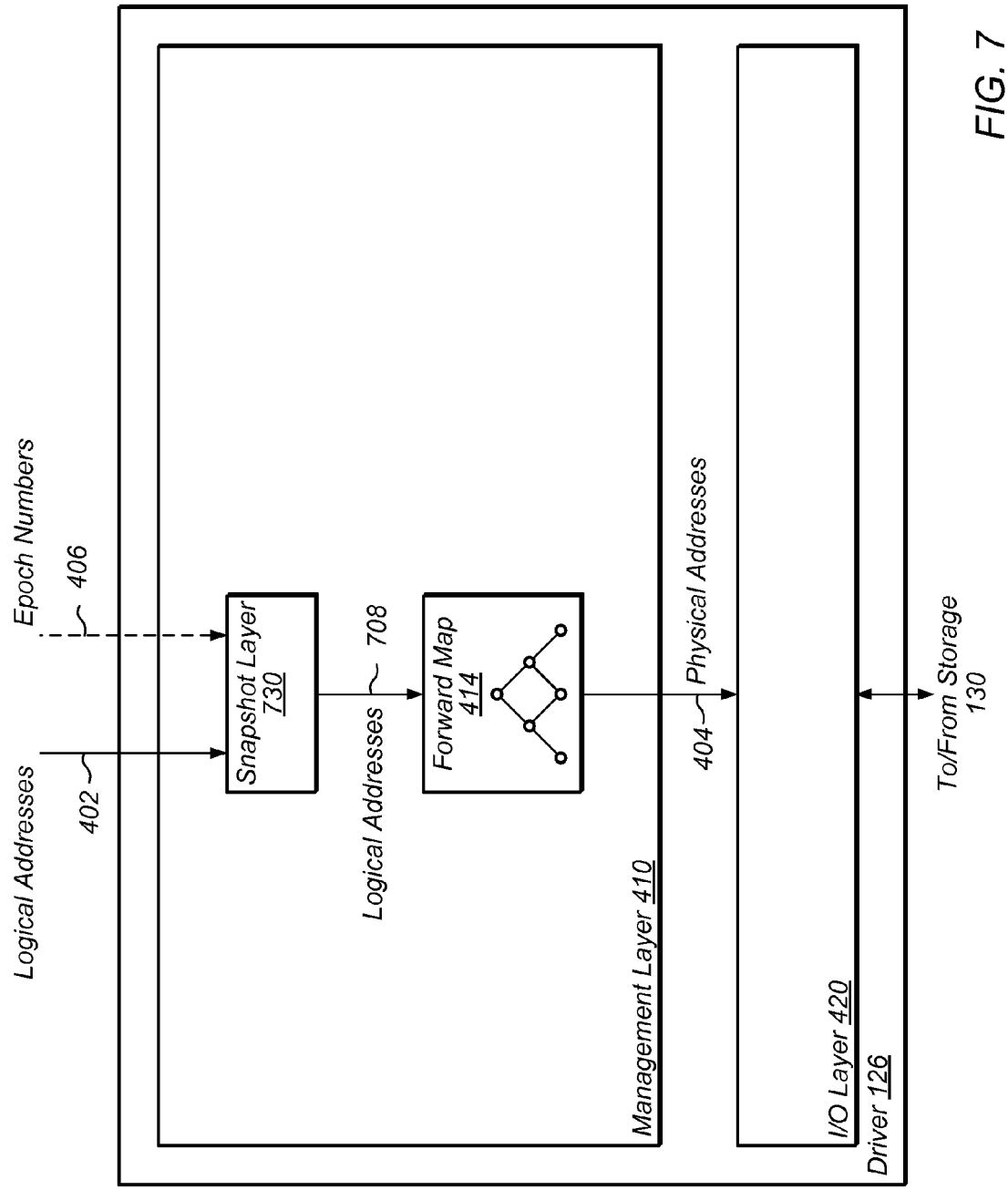
FIG. 7 is a block diagram illustrating another embodiment of a driver for the storage device.

Turning now to FIG. 7, a block diagram of driver 126 is depicted. In this embodiment, in contrast to the embodiments of FIGS. 4-6, driver 126 does not provide epoch numbers to a forward map. Driver 126 may be otherwise configured similarly to the embodiment described above with reference to FIG. 4, with the addition of snapshot module 730.

Snapshot layer 730, in one embodiment, generates a new logical address 708 based on a logical address 402 and an epoch number 406. For example, snapshot layer 730 may be configured to apply offsets to logical addresses 402 based on epoch numbers 406 in order to generate new logical addresses 708. In one embodiment, layer 730 may use data structure 280 to translate epoch number 406 and logical address 402 to a corresponding logical address 708 usable to index into map 414. In other embodiments, snapshot layer 730 includes other data structures, such as a unique forward map for the current epoch that maps logical address ranges to the epoch number in which they were written. As discussed above, epoch numbers 406 may be generated by driver 126, an application 122, and/or some other module. In the illustrated embodiment, forward map 414 may not include epoch numbers 406.

Figures 8A, 8B:
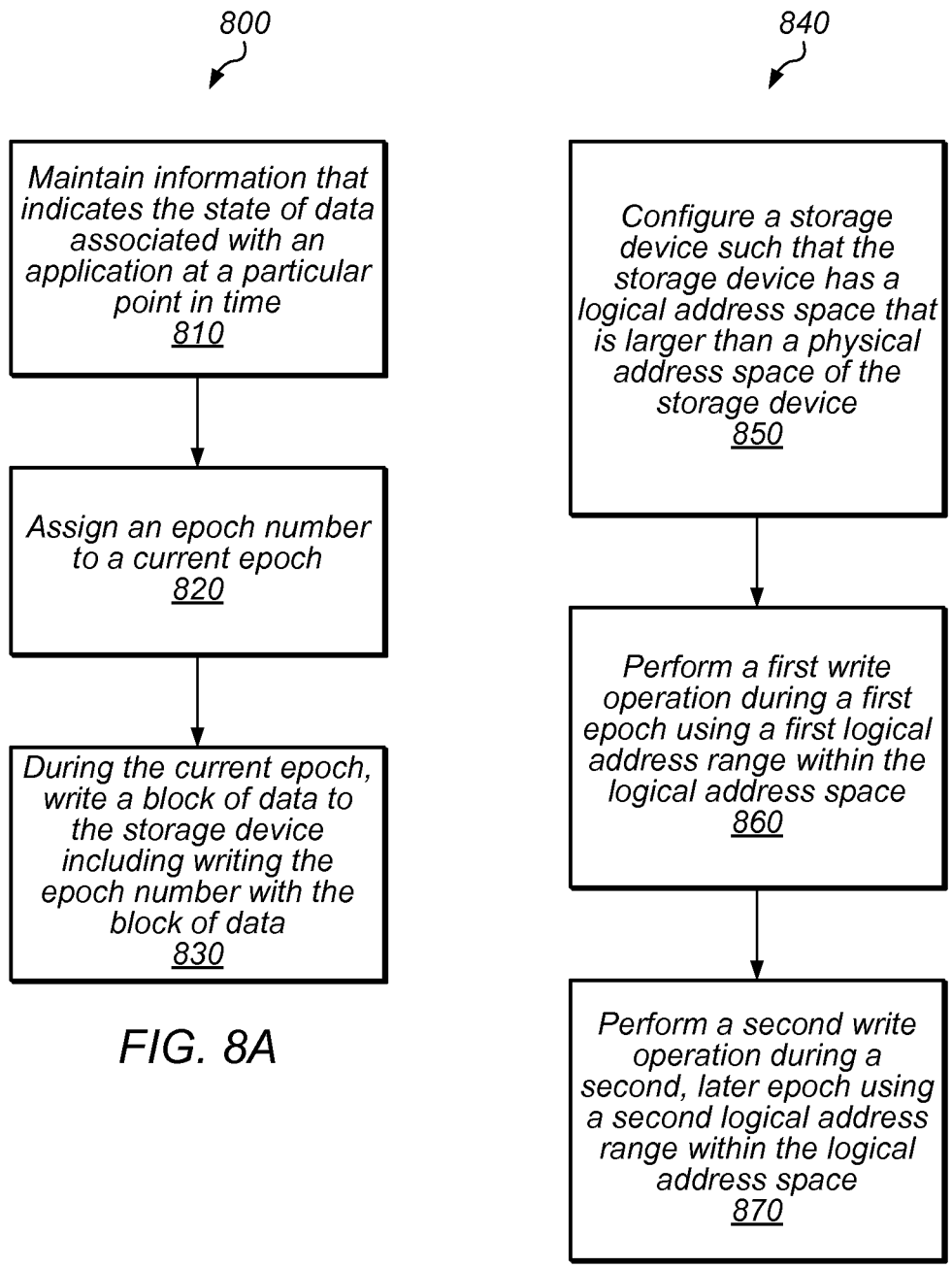
FIGS. 8A and 8B are flow diagrams illustrating embodiments of methods.

Turning now to FIG. 8A, a method 800 is depicted. Method 800 is one embodiment of a method that may be performed by an apparatus such as computing system 100 or storage device 130. Accordingly, in one embodiment, the apparatus may execute program instructions of a driver such as driver 126 to perform method 800.

In step 810, a computing system maintains information that indicates the state of data associated with an application at a particular point in time. The computer system may maintain this information based on a periodic snapshot schedule or at the request of an application, for example. Maintaining the information may include assigning a logical address range to a current epoch that follows the particular point in time.

In step 820, the computing system assigns an epoch number to a current epoch. The current epoch may be a time interval between the particular point in time and a later point in time. The computing system may assign the epoch number using a counter and may assign epoch numbers sequentially. In one embodiment, the epoch number is encoded in one or more address bits (e.g., the higher-order bits) of a logical address range associated with the current epoch.

In step 830, the computing system writes a block of data to the storage device during the current epoch. In this embodiment, writing the block of data includes writing the epoch number to the storage device with the set of data. The computing system may write the epoch number in metadata included with a packet of data. The epoch number written to the storage device may be used to reconstruct snapshot information in the event of data corruption. The epoch number written to the storage device may also be used to determine when a snapshot should be deleted and/or merged into a child snapshot, for example.

Turning now to FIG. 8B, a flow diagram of a method 840 is depicted. Method 840 is one embodiment of a method that may be performed by an apparatus such as computing system 100 or storage device 130. Accordingly, in one embodiment, the apparatus may execute program instructions of a driver such as driver 126 to perform method 840.

In step 850, a storage device is configured such that the storage device has a logical address space that is larger than a physical address space of the storage device. This sparse addressing may allow computing system 100 to allocate more space for snapshots than actually exists on a storage device.

In step 860, a first write operation is performed during a first epoch using a first logical address range within the logical address space.

In step 870, a second write operation is performed during a second, later epoch using a second logical address range within the logical address space. The first and second write operations may target the same location from the point of view or an application or may target different locations.

Figure 9:
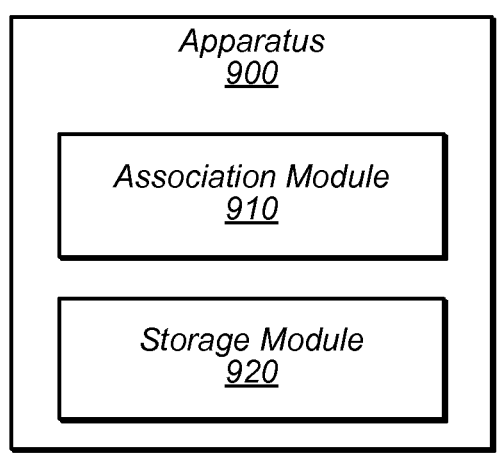
FIG. 9 is a block diagram illustrating one embodiment of an apparatus having an association module and a storage module.

Turning now to FIG. 9, a block diagram of an apparatus 900 that includes modules is depicted. As used herein, the term "module" refers to circuitry configured to perform operations or a memory having program instructions stored therein that are executable by one or more processors to perform operations. Accordingly, a module may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations. Apparatus 900 may include modules to implement any of the functionality described herein. For example, in the illustrated embodiment, apparatus 900 includes an association module 910 and a storage module 920.

Association module 910, in one embodiment, is configured to associate a logical address range for a storage device with an epoch number, where the epoch number is associated with writes to the storage device during a particular epoch. The logical address range may be part of a logical address space in a sparse addressing configuration. In some embodiments, storage module 1120 may implement functionality described with respect to driver 126.

Storage module 920, in one embodiment, is configured to handle one or more storage operations associated with the epoch number using the logical address range. For example, in one embodiment, storage module 920 uses addresses in the logical address range for write operations and maps the addresses to physical locations on storage device 130. Storage module 920 may direct read operations to the logical address range based on determining that the read operations are associated with the epoch number. Storage module 920 may direct read operations to other logical address ranges associated with one or more ancestor snapshots in response to determining that an block within the logical address range targeted by the read operation is not valid in the current snapshot data. In some embodiments, storage module 920 may implement functionality described with respect to driver 126, storage device 130, or a combination thereof.

In some embodiments, association module 910 and/or storage module 920 are within a controller such as controller 132. In another embodiment, modules 910 and/or 920 may be located within a memory such as memory 120. In sum, the modules of apparatus 900 may be implemented in any suitable manner to perform functionality described herein. Apparatus 900 may also correspond to any suitable structure having the functionality of modules 910-920. In one embodiment, apparatus 900 is a computing system that includes (or is coupled to) a storage such as storage device 130. In another embodiment, apparatus 900 is a card including a controller (such as controller 132) and one or more storage elements (such as storage banks 134). In yet another embodiment, apparatus 900 is a computing system including a memory system that stores modules 910 and/or 920.

Turning now to FIG. 10A, a block diagram of an apparatus 1000 that includes a determination means 1010, a translation means 1020, and a storage means 1030 is depicted. Apparatus 1000 may correspond to any suitable structure having the functionality of determination means 1010, translation means 1020, and storage means 1030. For example, apparatus 1000 may be any suitable type of computing device such as a server, laptop, desktop, a mobile device, etc. In some embodiments, apparatus 1000 may include multiple computing devices working together. In some embodiments, apparatus 1000 is a card including a controller (such as controller 132) and one or more storage elements (such as storage banks 134).

In various embodiments, determination means 1010 may implement any of the functionality described herein with respect to driver 126. Accordingly, in one embodiment, determination means 1010 determines a logical address for a write operation based on a current epoch number. For example, in one embodiment, determination means 1010 applies an offset to an address of the write operation based on the epoch number to determine the logical address. In one embodiment, determination means is configured to determine the logical address by encoding the epoch number in a logical address. For example, the epoch number may be encoded in the upper bits of the logical address. In some embodiments, determination means 1010 may also implement functionality other than that described in conjunction with driver 126.

In various embodiments, translation means 1020 may implement any of the functionality described herein with respect to driver 126. Accordingly, in one embodiment, translation means translates the logical address determined by determination means 1010 to a physical address or location on a storage device. For example, on one embodiment, translation means traverses map 128 in order to determine a physical address mapping 530 for the logical address. In some embodiments, determination means 1010 may also implement functionality other than that described in conjunction with driver 126.

Determination means 1010 and translation means 1020 may correspond to any suitable structures. In one embodiment, determination means 1010 and/or translation means 1020 are hardware circuits configured to perform operations (e.g., controller 132). The hardware circuits may include, for example, custom very-large-scale integration (VLSI) circuits or gate arrays, off-the-shelf semiconductors such as logic chips, transistors, or other discrete components. Means 1010 and/or 1020 may also be implemented in programmable hardware devices such as field programmable gate arrays, programmable array logic, programmable logic devices, or the like. In another embodiment, presentation means 1010 and/or 1020 includes a memory having program instructions stored therein (e.g., RAM 120) that are executable by one or more processors (e.g., processor unit 110) to implement an algorithm.

In one embodiment, determination means 1010 implements the algorithm discussed with respect to FIG. 10B. In some embodiments, translation means 1020 implements the algorithm discussed with respect to FIG. 10C. In some embodiments, determination means 1010 and/or translation means 1020 correspond to association module 910. Accordingly, the phrases "means for determining a logical address for a write operation based a current epoch number" and "means for translating the logical address to a physical address" refer to any of the structures listed above as well as their corresponding equivalents.

In various embodiments, storage means 1030 may implement any of the functionality described herein with storage device 130. Accordingly, in one embodiment, storage means 1030 is for storing the epoch number on the storage device. Storage means 1030 may store the epoch number at the same physical location as a target of the write operation or may store the epoch number at another location that is associated with the target of the write operation. Storage means 1030 may correspond to any suitable structure such as those discussed above with respect to storage device 130 (e.g., one or more banks 134, computing system 100, storage system 200, etc.). Accordingly, the phrase "means for storing the current epoch number on the storage device" refers to any of the structures listed above as well as their corresponding equivalents.

Turning now to FIG. 10B, a flow diagram illustrating an algorithm 1030 is depicted. Algorithm 1030 is one embodiment of an algorithm implemented by determination means 1010. In the illustrated embodiment, algorithm 1030 includes, at step 1032, receiving a write operation and an epoch number. Algorithm 1030 further includes, at step 1034, producing a logical address for the write operation based on the epoch number. The logical address may be produced by applying an offset to a logical address, by looking up the logical address in a data structure, and so on.

Turning now to FIG. 10C, a flow diagram illustrating an algorithm 1050 is depicted. Algorithm 1050 is one embodiment of an algorithm implemented by translation means 1020. In the illustrated embodiment, algorithm 1050 includes, at step 1052, accessing a data structure using a logical address. For example, translation means 1020 may access map 128 and reading a physical address mapping. Algorithm 1050 further includes, at step 1054, generating a physical address based on accessing the data structure. The physical address may be produced based on a log implementation.

Figure 11:
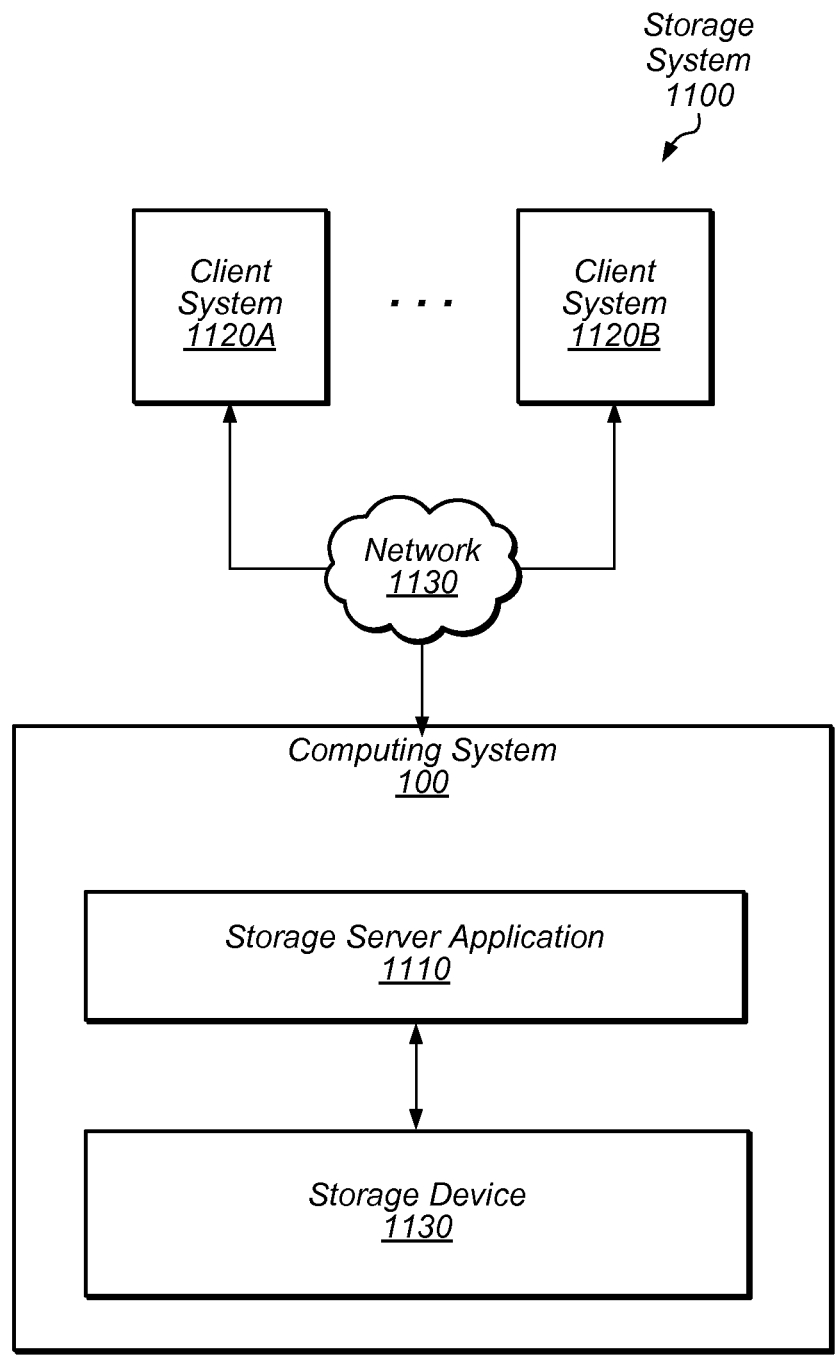
FIG. 11 is a block diagram illustrating one embodiment of a storage system.

Turning now to FIG. 11, a block diagram of a storage system 1100 including computing system 100 is depicted. As discussed above, computing system 100 may include applications 122 that operate on data stored in storage device 130. In the illustrated embodiment, computing system 100 executes a storage server application 1110 to enable client systems 1120A and 1120B to access and store data in storage device 1130 via network 1230. For example, in one embodiment, storage system 1100 may be associated within an enterprise environment in which server application 1110 distributes enterprise data from storage device 1130 to clients 1120. In some embodiments, clients 1120 may execute other server applications such as web servers, mail servers, virtual private network (VPN) servers, etc. to further distribute data to other computing systems. Accordingly, in some embodiments, storage server application 1110 may implement various network attached storage (NAS) protocols such as the file transfer protocol (FTP), network file system (NFS) protocol, server message block (SMB) protocol, Apple file protocol (AFP), etc. In some embodiments, computing system 100 may be one of several computing systems 100 configured to implement a storage area network (SAN).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
maintaining, by a computing system, information that indicates the state of data associated with an application at a particular point in time;
assigning, by the computing system, an epoch number to a current epoch, wherein the current epoch is an interval between the particular point in time and a future point in time;
writing, by the computing system during the current epoch, a block of data to the storage device using a logical address, wherein the writing includes storing the epoch number in the same page as the block of data and wherein one or more bits of the logical address encode the epoch number.

2. The method of claim 1, further comprising:
associating, by the computing system, a logical address range with the epoch number;
translating, by the computing system, an address of a storage request from the application during the current epoch to a logical address within the logical address range; and
storing, by the computing system, the logical address with the block of data.

3. The method of claim 2, further comprising:
the computing system providing a logical address space for a storage device on which the block of data is stored, wherein the logical address space is larger than a physical address space of the storage device, wherein the logical address range is part of the logical address space.

4. The method of claim 1, wherein a size of the block of data is a smallest addressable unit for a storage device to which the block is written.

5. The method of claim 1, wherein the information includes snapshot data for a snapshot that shares a common ancestor snapshot with one or more other snapshots.

6. The method of claim 1, further comprising:
servicing a read request during the current epoch by providing data written to a storage device during a previous epoch.

7. The method of claim 1, further comprising:
performing a storage request that is associated with the epoch number by:
determining an entry in a forward mapping structure based on the epoch number; and
translating a logical address of the storage request to a physical address of a storage device using the entry.

8. The method of claim 1, further comprising:
receiving a storage request and an epoch number associated with the storage request; and
applying an offset to an address of the storage request based on the epoch number.

9. The method of claim 1, further comprising:
merging, after an end of the current epoch, the information with other information that indicates the state of data at the beginning of a later epoch, wherein the merging includes associating data written during the current epoch with an epoch number of the later epoch.

10. The method of claim 1, further comprising:
reconstructing a data structure that indicates parent-child relationships between one or more snapshots based on the epoch number stored with the block of data.

11. An apparatus, comprising:
an association module configured to associate a logical address range for a storage device with an epoch number, wherein the epoch number is associated with write operations to the storage device during a particular epoch; and
a storage module configured to service one or more storage operations associated with the epoch number using the logical address range, wherein one or more bits of logical addresses in the logical address range encode the epoch number of the particular epoch,
wherein at least a portion of the association module and storage module comprise one or more of a hardware circuit and program instructions stored on one or more non-transitory computer readable media.

12. The apparatus of claim 11, wherein the storage module is further configured to:
perform a write operation that includes writing a block of data to the storage device including storing the epoch number on the storage device in the same erase block as the block of data.

13. The apparatus of claim 11, wherein the storage module is further configured to:
perform a read operation using a different logical address range associated with an epoch number of a previous epoch in response to determining that the read operation is for data written during the previous epoch; and
translate a logical address within the different address range to a physical address of the storage device to perform the read operation.

14. The apparatus of claim 11, wherein the storage module is further configured to:
perform a write operation to a logical address in the logical address range; and
indicate that the logical address is associated with valid data for the particular epoch.

15. The apparatus of claim 11, wherein the storage module is further configured to:
delete data associated with the particular epoch by issuing a trim command for the logical address range.

16. A non-transitory computer readable medium having program instructions stored thereon, wherein the program instructions are executable by a computing system to cause the computing system to perform operations comprising:
configuring a storage device such that the storage device has a logical address space that is larger than a physical address space of the storage device;
performing a first write operation during a first epoch using a first logical address range within the logical address space, wherein one or more bits of logical addresses in the first logical address range encode a first epoch number; and
performing a second write operation during a second, later epoch using a second logical address range within the logical address space, wherein one or more bits of logical addresses in the second logical address range encode a second epoch number.

17. The non-transitory computer-readable storage medium of claim 16,
wherein the performing the first write operation during the first epoch includes storing an epoch number associated with the first epoch and a first logical address on the storage device at a location associated with the write operation, wherein the first logical address is within the first logical address range.

18. The non-transitory computer-readable storage medium of claim 16, wherein the operations further comprise:

applying an offset to an address of a storage request based on an epoch number provided with the storage request, wherein applying the offset provides a new logical address.

19. The non-transitory computer-readable storage medium of claim 16, wherein the operations further comprise:
   receiving a read request during the second epoch;
   determining that a logical address for the read request in the second logical address range does not have a valid translation to a physical address; and
   in response to the determining, servicing the read request using data from a physical location mapped to a logical address in the first address range.

20. The non-transitory computer-readable storage medium of claim 16, wherein the operations further comprise:
   handling storage requests to the storage device using a strict log structure.

21. An apparatus, comprising:
   a first means for determining a logical address for a write operation based a current epoch number, wherein one or more bits of the logical address encode the current epoch number;
   a second means for translating the logical address to a physical address on a storage device; and
   a third means for storing the current epoch number on the storage device, wherein storing the current epoch number comprises storing the current epoch number at the same physical location as a target of the write operation.

* * * * *